United States Patent [19]

Sloane

[11] Patent Number: 4,989,158

[45] Date of Patent: Jan. 29, 1991

[54] VIBRATION CONTROL SYSTEM

[75] Inventor: Edwin A. Sloane, Los Altos, Calif.

[73] Assignee: Schlumberger Technologies Limited, Farnborough, England

[21] Appl. No.: 528,645

[22] Filed: May 24, 1990

Related U.S. Application Data

[63] Continuation of Ser. No. 283,445, Dec. 15, 1988.

[51] Int. Cl.[5] ............................................. G01N 29/00
[52] U.S. Cl. ........................................ 364/508; 73/664
[58] Field of Search .................. 73/664; 364/507, 506, 364/508

[56] References Cited

U.S. PATENT DOCUMENTS

| | | |
|---|---|---|
| 3,710,082 | 1/1973 | Sloane et al. .......................... 73/664 |
| 3,848,115 | 11/1974 | Sloane et al. . |
| 3,973,112 | 8/1976 | Sloane ................ 364/576 |
| 4,513,620 | 4/1985 | Uretsky et al. ...................... 73/664 |
| 4,513,622 | 4/1985 | Uretsky .............................. 73/664 |
| 4,537,076 | 8/1985 | Lax et al. ............................ 73/662 |

Primary Examiner—Gary Chin
Assistant Examiner—S. A. Melnick
Attorney, Agent, or Firm—Townsend and Townsend

[57] ABSTRACT

A randomization unit for use in a vibrational control system for generating a series of randomized drive terms where the magnitude of each randomized drive term is the convolution of a psuedo-random sequence of bistable signals and a drive data sequence characterized by a drive power spectral density (PSD). The randomization unit does not require multipliers to perform the convolution operation.

10 Claims, 7 Drawing Sheets

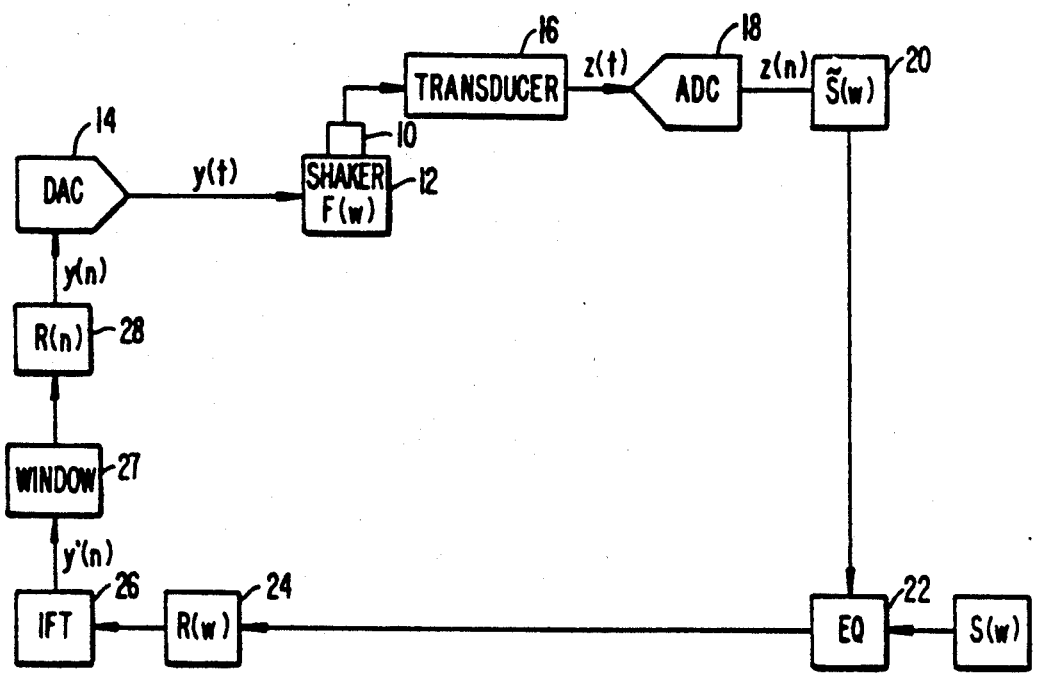
FIG._1.
(PRIOR ART)
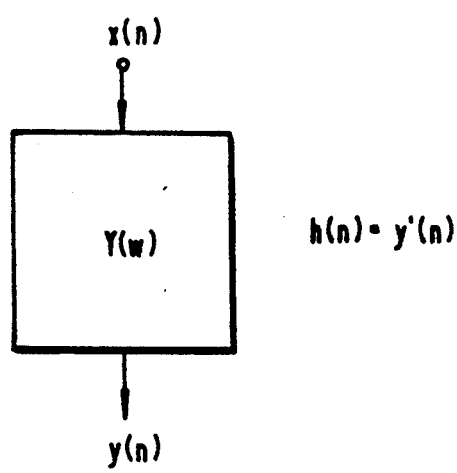
FIG._4.

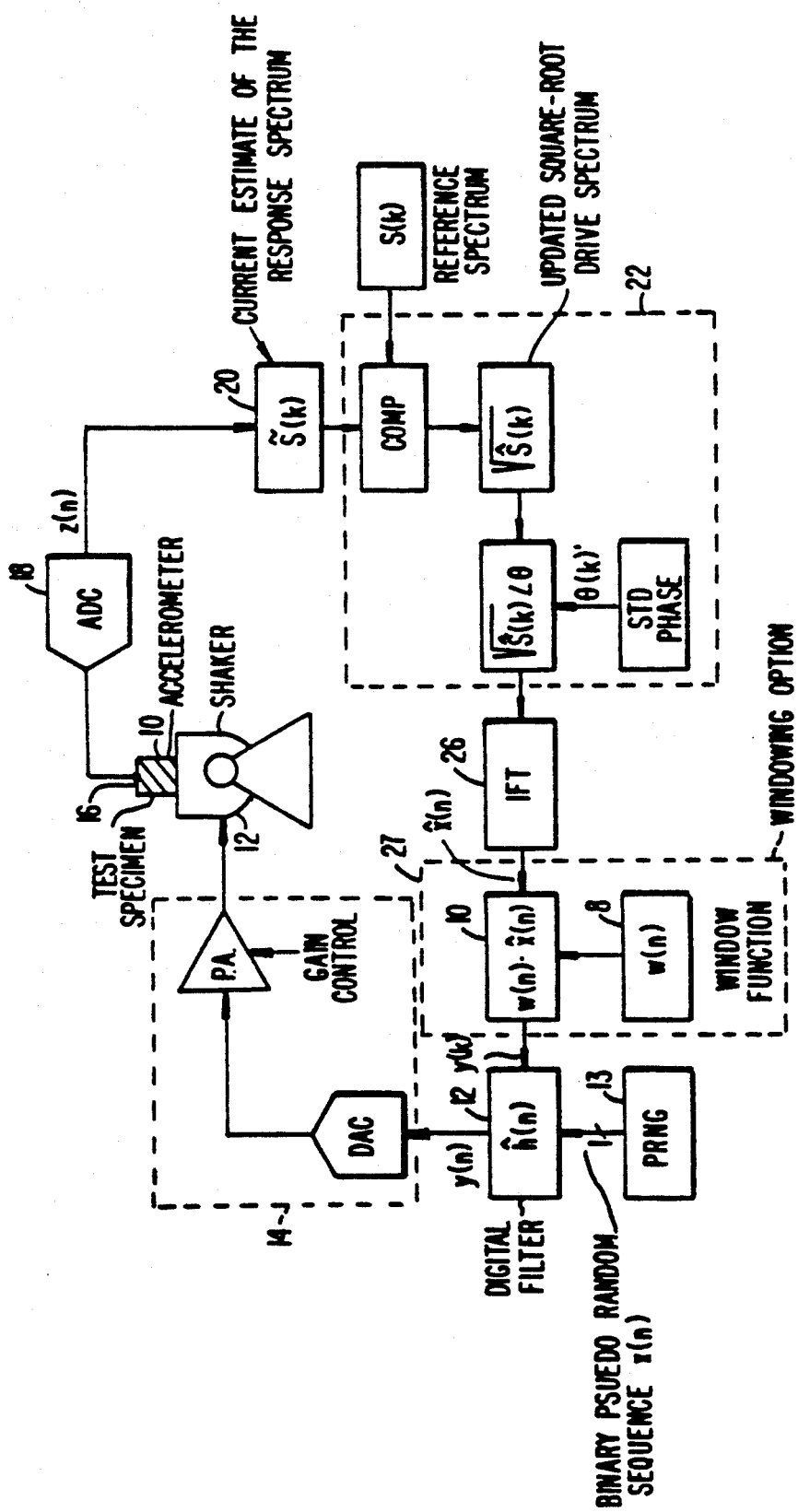
FIG._3.

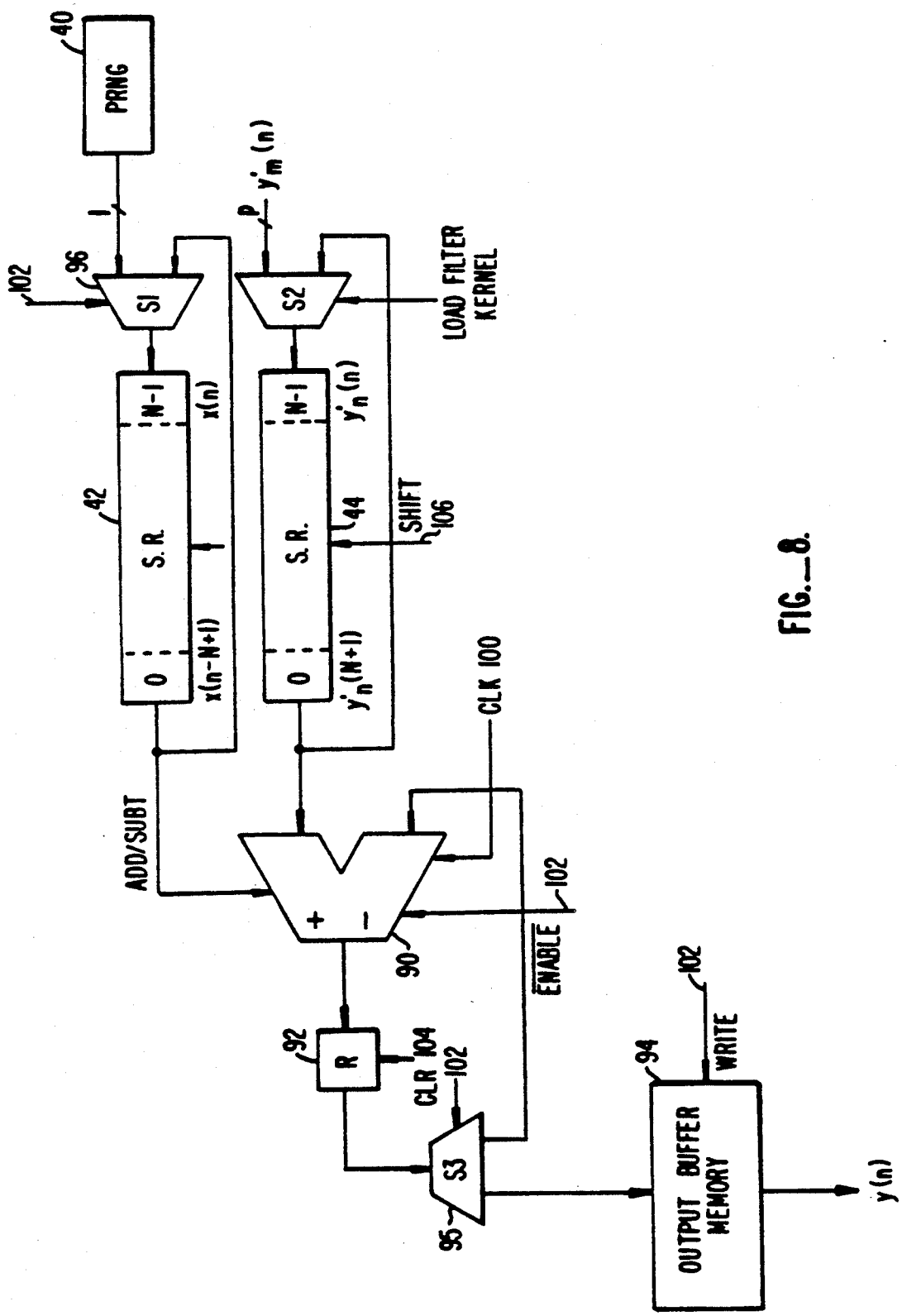
FIG._8.

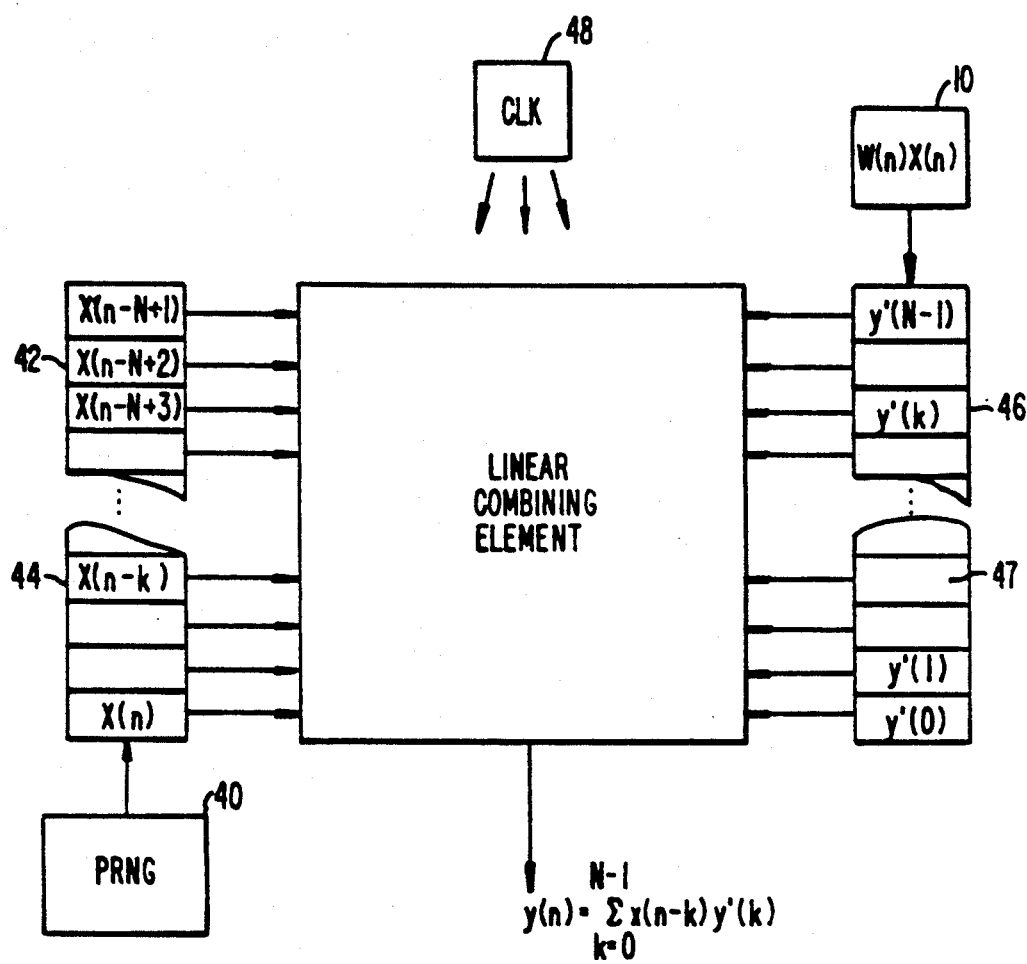
FIG._5.
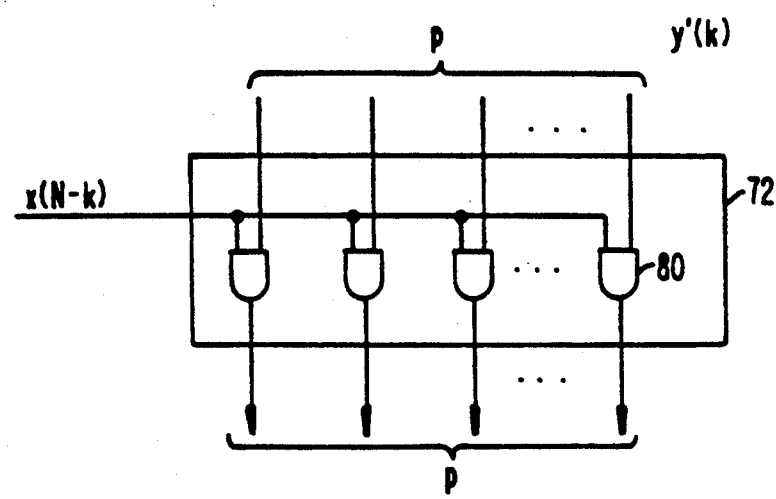
FIG._7.

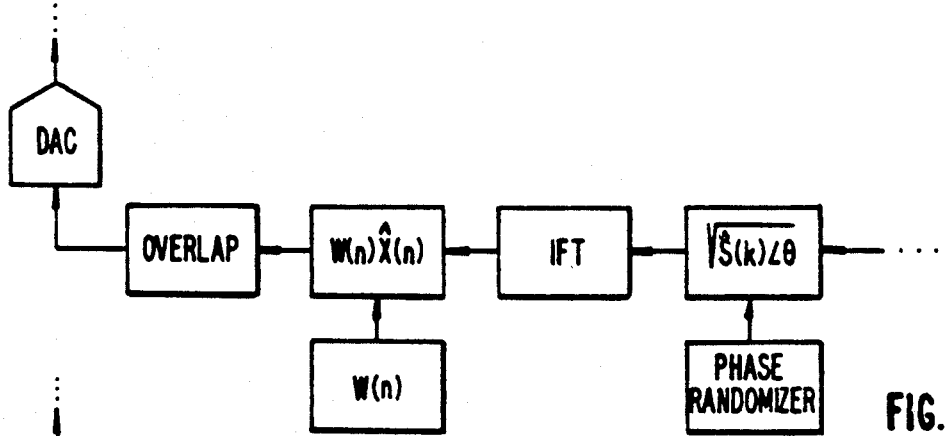
FIG._2a.
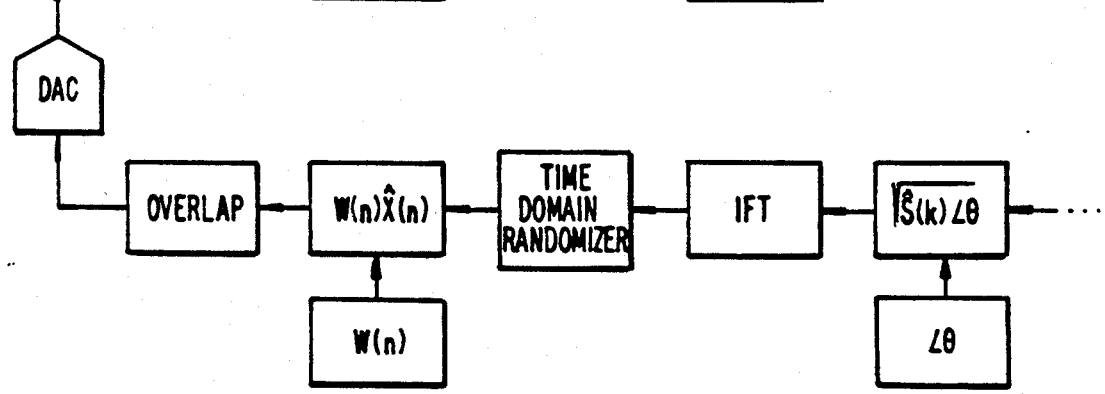
FIG._2b.
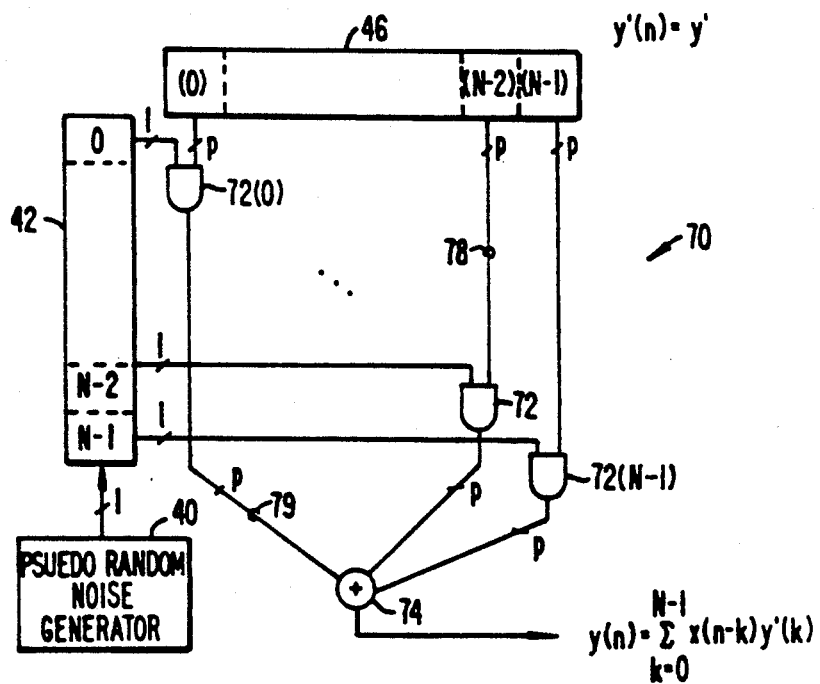
FIG._6.

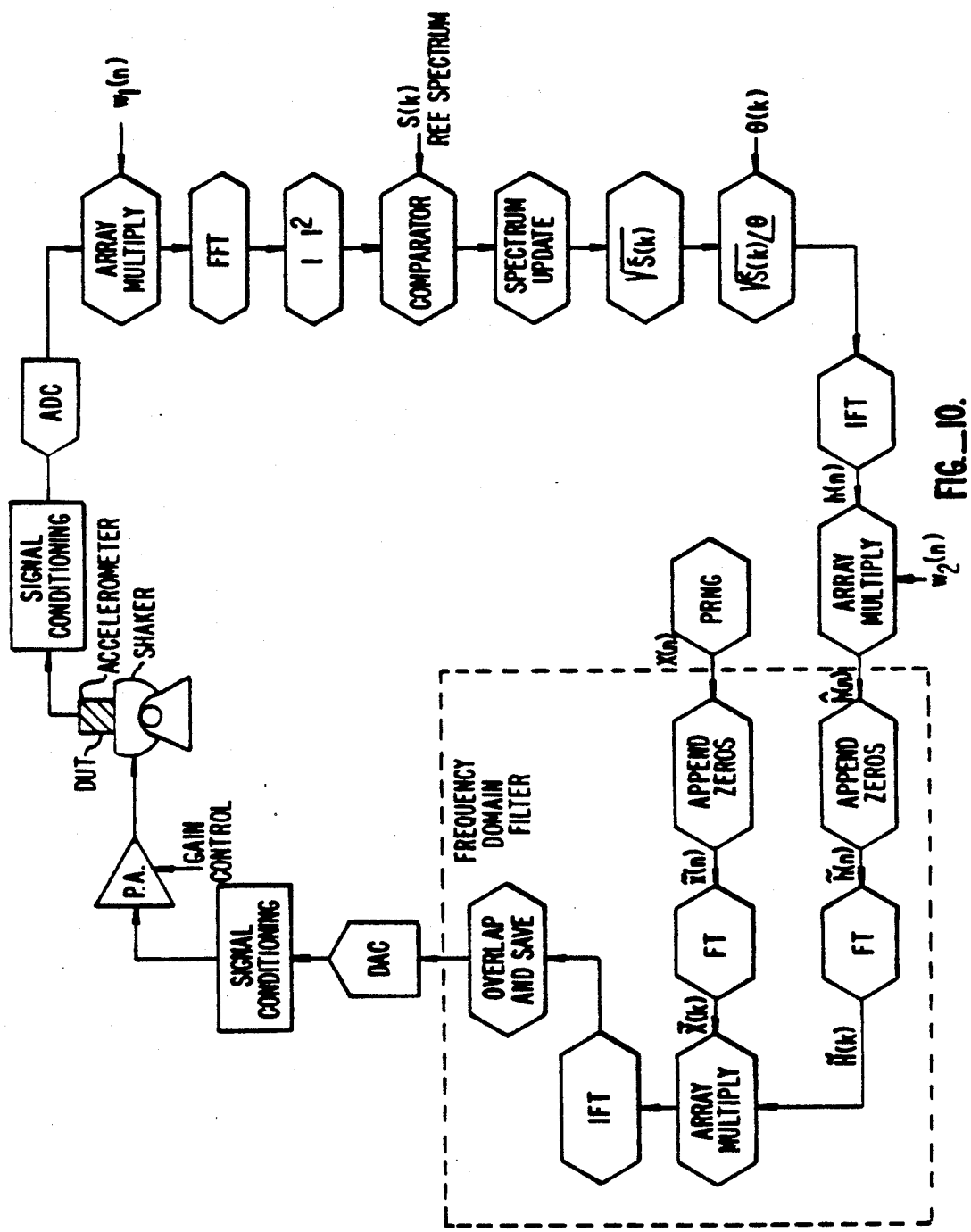
FIG._10.

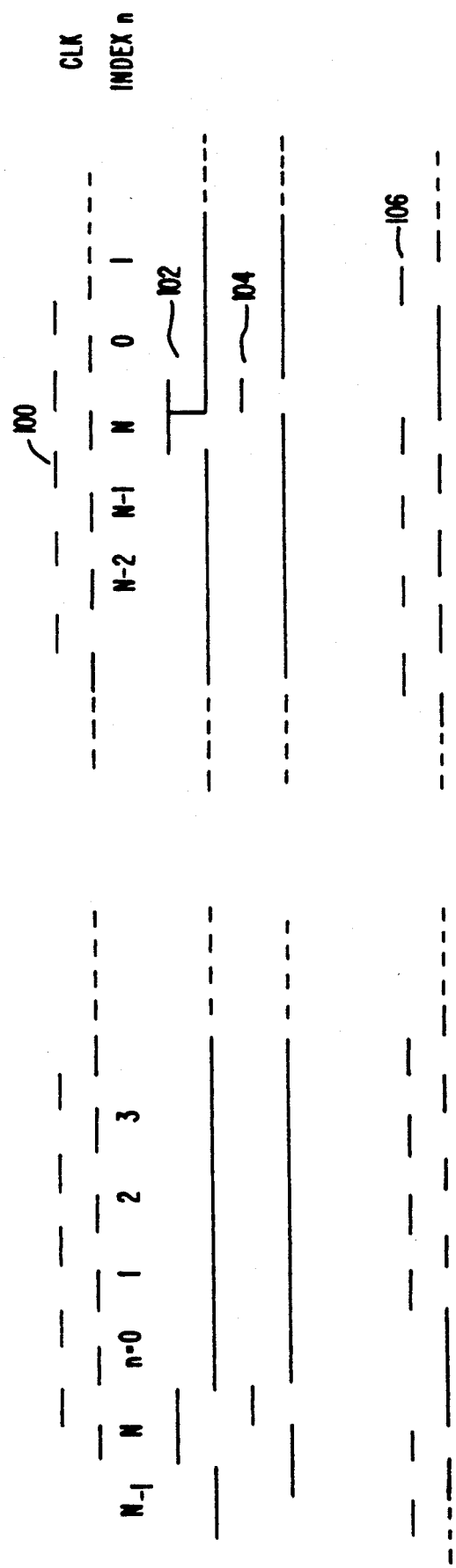
FIG._9.

VIBRATION CONTROL SYSTEM

This is a continuation of application Ser. No. 07/283,445 filed Dec. 15, 1988.

BACKGROUND OF THE INVENTION

It is often required to test a particular piece of equipment to determine whether it will properly function in an intended environment. One important factor is the vibrational energy generated in the intended environment. For example, the piece of equipment may be utilized in a space craft and therefore must survive the intense vibrational energy generated during lift off.

The actual vibrational energy experienced is the response to many independent vibrational sources and thus the distribution function of the amplitude over time is represented by a Gaussian distribution. Being Gaussian, this vibrational energy is completely specified by the amplitude distribution and the spectral power density function (PSD) (the first and second order statistics). In practice this reference PSD is often determined by recording the actual environmental vibrational energy and determining the PSD.

A well known system for subjecting a device under test (DUT) to vibrational energy is illustrated in FIG. 1. The DUT 10 is mounted on a shaker table 12 which receives a drive signal, y(t), from a driver 14. It would appear, at first glance, that the drive signal should be characterized by the reference PSD. However, the drive signal is applied to the shaker/DUT system which modifies the actual PSD of the energy applied to the DUT because of their combined transfer function. Accordingly, the drive PSD must be modified so that the PSD characterizing the actual motion of the sample is equal to the reference PSD.

A feedback system for generating a drive signal for subjecting the DUT to vibrational energy characterized by the reference PSD is depicted in the remainder of FIG. 1. A transducer 16 is coupled to the DUT 10 to convert the vibrations of the DUT 10 into an electrical signal. The output of the transducer is coupled to an analog to digital unit (ADC) 18 subsystem that may include signal conditioning such as filters, which has its output coupled to PSD estimation unit ($\bar{S}(\omega)$) 20. An equalization unit 22 has one input coupled to the output of the PSD estimator ($\bar{S}(\omega)$) 20 and the second input connected to a reference spectrum, $S(\omega)$, and its output coupled to the input of a frequency domain randomization unit 24. An inverse Fourier transform unit (IFT) 26 has its input coupled to the output of the frequency domain randomization unit 24 and its output coupled to a window function unit 27. The output of the window function unit 27 is coupled to the input of a time domain randomization unit 28. The output of the time domain randomization unit 28 is coupled to the input of the driver 14 which includes a DAC, power amplifier, and may include additional signal conditioning. In practice, a given system may omit the time domain randomization unit 28, the frequency domain randomization unit 24, the window function unit 27, or some combination thereof.

The basic purpose of the Random Vibration Control System is to have the device under test (DUT) experience a prescribed vibration as sensed at one or more points on the DUT by an appropriate transducer (accelerometer, typically). Said prescribed vibration is usually required to be Gaussian (normal) which implies that the first and second order statistics are necessary and sufficient for complete specification. The first order statistic is simply the amplitude probability density function $$p(x) = \frac{e^{\frac{-x^2}{2\sigma^2}}}{\sigma\sqrt{2\pi}}$$

where $\sigma$ is the RMS value of the random process. The second order statistic describes the frequency content or spectrum of the normally distributed signal which controls the correlation (or covariance) between successive values of the random signal. Either, the PSD, $S(\omega)$, or its Fourier transform, the auto correlation function, $\phi(t)$, are usually used to specify this statistic because these two functions constitute a Fourier transform pair $$S(\omega) \longleftrightarrow \phi(t)$$

Because digital signal processing techniques are used in these control systems, uniformly sampled time domain and frequency domain functions are used in the control loop: analog to digital converters and discrete Fourier transform usually providing the means for obtaining sampled functions.

It is important to recognize that an essential feature of these normal random signals is that the discrete Fourier transform X(k) of a sample segment of x(n), consisting of N samples duration given by $$X(k) = \sum_{n=0}^{N-1} x(n)e^{-j\frac{2\pi kn}{N}}, \quad 0 \leq k \leq N-1$$

is a complex function of the frequency index, k, such that $$X(k) = P_x(k) + jQ_x(k)$$

where $$P_x(k) = \sum_{n=0}^{N-1} x(n)\cos\frac{2\pi kn}{N}$$

$$Q_x(k) = -\sum_{n=0}^{N-1} x(n)\sin\frac{2\pi kn}{N}$$

Note that if the set of values $\{x(n)\}$ are randomly distributed, the real part $P_x(k)$ and the imaginary part, $Q_x(k)$, being weighted sums of these randomly distributed samples must also be random. Further, if x(n) is normally distributed, $P_x(k)$ and $Q_x(k)$ will be, for certain, normally distributed. Thus, the Fourier transform of a normally distributed signal is a complex random function with normally distributed real and imaginary parts. $P_x(k)$ and $Q_x(k)$ are, also, uncorrelated because the weights in $\cos 2\pi kn/N$ and $\sin 2\pi kn/N$ used to obtain each part are orthogonal (uncorrelated).

If the complex function, X(k), is expressed in polar coordinate form, $$X(k) = |X(k)|e^{j\theta(k)}$$

where

-continued
$$\theta(k) = \tan^{-1}\left(\frac{Q_x(k)}{P_x(k)}\right)$$

then $\theta(k)$ can be shown to be uniformly distributed on the interval $0 \leq \theta \leq 2\pi$, while $|X(k)|$ is Rayleigh distributed.

In order to establish control of the vibrations, the spectrum of the vibrations must be estimated and compared with the desired spectrum so that the spectral content of the drive signal may be appropriately tailored to produce the desired result. Conceptually, it is a straightforward problem: estimate the transfer function by estimating the transfer function between the input to the DAC 14 and the output of the ADC 18 from which the necessary drive signal may be determined. In practice, problems may arise because the vibrations are random, the system may be noisy and may also be non-linear.

Because the sensed response, z(n) is random, the Fourier transform, in accordance with the previous discussion, is also random. This means that each of the individual estimated spectrums or periodograms will be a random function. Specifically, the spectral estimator of the response signal that we desire is $$S_z(k) = \lim_{M \to \infty} \frac{\tau}{MN} \sum_{m=0}^{M-1} |Z_m(k)|^2$$

where $$Z_m(k) = \sum_{n=0}^{N-1} z_m(n) e^{-j\frac{2\pi kn}{N}}$$

or $$Z_m(k) = P_{zm}(k) + jQ_{zm}(k),$$

$\tau$ is the sampling interval and $z_m(n)$ is the $m^{th}$ response data frame. Hence $$S_z(k) = \lim_{M \to \infty} \frac{\tau}{MN} \sum_{m=0}^{M-1} [P_{zm}^2(k) + Q_{zm}^2(k)]$$

or $$S_z(k) = \lim_{M \to \infty} \frac{\tau}{MN} \sum_{m=0}^{M-1} S_{zm}(k)$$

where $P_{zm}^2(k)$ and $Q_{zm}^2(k)$ are each squared Gaussian variables that are, therefore, chi-squared distributed with one degree of freedom each. The sum of the terms $$\frac{\tau}{N}[P_{zm}^2(k) + Q_{zm}^2(k)],$$

known as the "raw" spectral estimates or periodograms, is also chi-squared distributed but with two degrees of freedom, and has a relative variance of unity with respect to its true mean value. The purpose for averaging over an infinite ensemble of such terms is to estimate $S_z(k)$ by reducing these variances. In practice a finite weighted sum of "raw" spectral estimates, $S_{zm}(k)$, are used as a basis of control. For example $$\bar{S}_{z,m+1}(k) = \alpha \bar{S}_{z,m}(k) + (1-\alpha)\hat{S}_{z,m+1}(k)$$

where $\bar{S}_{z,m}(k)$ is the $m^{th}$ spectral estimate;

$\hat{S}_{z,m}(k) = \frac{\tau}{N}[P_{z,m}^2(k) + Q_{zm}^2(k)]$ is the $m^{th}$ "raw" estimate;

$\alpha$ is a "discount" averaging factor ($0 < \alpha < 1$).

Thus, this spectral estimate will have errors (variance) because of the finite number of degrees of freedom used in the estimate. The variance decreases inversely with m. Additional variance may be introduced by such non-linear PSD estimating techniques as windowing of the sampled response data, z(n), for purposes of reducing leakage in the spectral estimate.

Because the system may also be noisy and non-linear a stochastic approximation algorithm is used that introduces less than the total correction implied by the latest average response spectrum. Thus, a typical correction for the drive Fourier transform magnitude may take on the form $$|X_{m+1}(k)| = |X_m(k)| \left[\frac{S(k)}{S_{m+1}(k)}\right]^\epsilon$$

or $$\log |X_{m+1}(k)| = \log |X_m(k)| + \epsilon[\log S(k) - \log S_{m+1}(k)]$$

where $0 < \epsilon < \frac{1}{2}$ is the stochastic weighting factor. This procedure results in a deterministic magnitude function whereas what we desire is $$X_{m+1}(k) = |X_{m+1}(k)| e^{j\theta_{m+1}(k)} = P_{x,m+1}(k) + jQ_{x,m+1}(k)$$

whee $|X_{m+1}(k)|$ is Rayleigh distributed, $\theta_{m+1}(k)$ is uniformly distributed or equivalently $P_{x,m+1}$ and $Q_{x,m+1}$ are independently normally distributed in order to produce a proper Gaussian distributed drive function, $x_{m+1}(n)$ after taking the inverse Fourier transform of $X_{m+1}(k)$.

Prior art has established that an acceptable approximation to the normal drive signal may be achieved by only randomizing X(k) by introducing a random phase function $\theta(k)$. See U.S. Pat. No. 3,710,082. Because the central limit theorem asserts that the sum of a large number of random variables tends to be Gaussian, almost independent of their particular distributions, the inverse Fourier transform, $x_{m+1}(n)$, will also be approximately Gaussian. This procedure has been dubbed "frequency domain" randomization even though only the phase is randomized and not the amplitude also.

A further variant was also introduced by Sloane et al., see U.S. Pat. No. 3,848,115 that has been popularly referred to as time domain randomization that is based on randomizing phase only by random circular rotation of x(n). This procedure also only randomizes phase, and not both phase and amplitude.

The time domain function, $x_m(n)$, is a finite length array of N data points that could be concatenated with other such arrays to produce a continuous stream, x(m,n) such that $$x(m,n) =$$

-continued $$x_0(n) + x_1(N + n) + \ldots + x_m(mN + n) = \sum_{i=0}^{m} x_i(iN + n)$$

where $0 \leq n \leq N-1$. However, it was found in Sloane et al. that the uniform weighting implied by construction of x(m,n) introduced unacceptable spectral leakage that limited the ability to control systems exhibiting large sharp resonances or being able to control when the desired reference spectrum, S(k), had large dynamic range characteristics. As a result, non-uniform windowing of $x_m(n)$ was introduced in order to control this spectrum.

FIG. 2A and 2B depict systems utilizing phase domain and time domain randomization, respectively, followed by windowing and overlap and add.

From a practical point of view, non-uniform windowing by itself could not be arbitrarily applied to each segment, $x_m(n)$, because concatenation of such a sequence, $$x(m,n) = \sum_{i=0}^{m} w(iN + n)x_m(iN + n)$$

where w(n) is the window function, would produce a non-stationary output sequence whose instantaneous power was a periodic function proportional to $w^2(n)$ in violation of the usual requirement that, at steady-state or at convergence of control to the proper spectrum, the drive function must also be a stationary normal process. This led to the introduction of overlapping in addition to windowing. A further implicit constraint was thus established on the choice of window functions because, for example, a 50% overlap of windowed arrays required that $$w^2(n) + w^2\left(\frac{N}{2} + n\right) = C, \ 0 \leq n \leq \frac{N}{2} - 1$$

where c is a constant. For the 50% overlap case, this restricted the choice of window to the half-sine window $$w(n) = a \sin \frac{\pi n}{N}, \ 0 \leq n \leq N - 1$$

so that $$w\left(\frac{N}{2} + n\right) = a \cos \frac{\pi n}{N}, \ -\frac{N}{2} \leq n \leq \frac{N}{2} - 1$$

Thus $$w^2(n) + w^2\left(\frac{N}{2} + n\right) =$$

$$a^2\left[\sin^2 \frac{\pi n}{N} + \cos^2 \frac{\pi n}{N}\right] = a^2, \ 0 \leq n \leq \frac{N}{2} - 1$$

Unfortunately, this constraint on the window function restricted the choice to one of the least effective of all window functions. Thus, we conclude that the state of the art is deficient on several counts:

1. Dynamic range is limited because of the windowing constraint.
2. True phase and frequency randomization are lacking.
3. Even under the best circumstances, the second order statistics are non-stationary because the overlap and windowing operations result in a correlation function that is a function of two times, $\phi(t_1,t_2)$, rather than the stationary function which is only dependent on the time difference $T = t_1 - t_2$, or $\phi(t_1 - t_2) = \phi(T)$.

SUMMARY OF THE INVENTION

The objective of this invention is to provide true randomization of both amplitude and phase and optimal leakage control in a practical and efficient manner by either time domain or frequency domain operations that also preserve the quality of the second order statistics. Specifically, the method involves digital filtering of a random sequence by a windowed impulse response function that is determined from a comparison of response and control spectrums. Two methods, one based on time-domain convolution and the second on the equivalent frequency-domain operation, are disclosed that lead to comparably equivalent results.

According to one aspect of the invention, a time domain digital filter is implemented so that each term in the drive data sequence is gated by a corresponding bistable signal in the randomized sequence. The value of the gated signal is zero if the corresponding bistable signal is in a first state and the value is equal to the corresponding term in the drive data sequence if the corresponding bistable signal is in a second state. The gated signals are then summed to form convolution term. These convolution terms are utilized as the randomized drive data sequence.

The result of the gating and summing operations is to generate a linear combination of the terms in the drive data sequence, with the coefficient of each term equal to zero or one depending on the state of the corresponding bistable signal. Accordingly, the convolution is performed without utilizing multipliers. According to a further aspect of this embodiment, the drive and randomized sequences are stored in shift registers with the parallel outputs of the shift register coupled to the inputs of gating elements for gating the terms in the drive data sequence as described above.

According to another aspect of the invention, the bistable signals in the randomized control sequence are utilized to control an adder/subtracter unit (ASU) having a first input port for receiving a corresponding term in the drive data sequence and second input port coupled to an output port of the ASU. A linear combination is formed with each term either added or subtracted to the combination as determined by the state of the corresponding bistable signal.

Thus, a linear combination of the terms of the drive data sequence are formed with the coefficient of each term being $-1$ or $+1$ as determined by the state of the corresponding bistable signal. Accordingly, the convolution is performed without using multipliers.

Additional features and advantages of the invention will become apparent in view of the drawings and the following detailed description.

BRIEF DESCRIPTION OF THE DRAWINGS

FIG. 1 is a schematic diagram of a typical prior art vibration control system;
FIGS. 2A and 2B are schematic diagrams of prior art systems utilizing windowing and overlap and add;
FIG. 3 is a functional block diagram of the invention.
FIG. 4 is a block diagram of a randomization system;
FIG. 5 is a block diagram of the invention;

FIG. 6 is a schematic diagram of a unipolar embodiment of the present invention;

FIG. 7 is a detailed schematic diagram of a gating element utilized in the embodiment of FIG. 4;

FIG. 8 is a schematic diagram of a bipolar embodiment of the present invention;

FIG. 9 is a timing diagram illustrating the operation of the embodiment of FIG. 6; and FIG. 10 is a schematic diagram of a vibration control system using a frequency domain digital filter.

DETAILED DESCRIPTION OF THE PREFERRED EMBODIMENTS

Referring now to the drawings, where like reference numerals identify identical or corresponding parts, FIG. 3 is a functional block diagram of an embodiment of the present invention. Referring to FIG. 1, a vibration control system having many elements common to the to the prior art system described with reference to FIG. 1 is depicted.

In FIG. 3, a window function generator 8 is coupled to a first input of a windowing unit 10. The windowing unit 10 has a second input coupled to the output of the IFT and receives a time domain digital drive data sequence, $x(n)$, characterized by the reference PSD. The output of the windowing unit 10 is coupled to first input of a special digital filter 12. The second input of digital filter 12 is coupled to the output of a psuedo-random number generator (PRNG) 13.

The operation of the embodiment of FIG. 3 will now be described. The window selection function generated by the windowing function generator 8 is not limited as in the prior art. Efficient windows with low spectral leakage, such as Dolph-Tchebychev or Kaiser-Bessel windows, may be selected. The windowed drive data sequence functions as a digital representation of the impulse response of the digital filter 12. Accordingly, the result of filtering the output of the PRNG 13 is to generate a randomized drive data sequence characterized by the reference PSD, having low spectral leakage, and a Gaussian amplitude distribution. The average power of the randomized drive data sequence is a constant, regardless of the form of the window function. Specific time and frequency domain implementations of the digital filter 12 are described below.

FIG. 5 is a block diagram of an embodiment of the invention. Referring to FIG. 5, a unit 40 for generating a random, or psuedo-random, sequence of bistable signals has an output port coupled to the serial input port of a first N-stage, serial in, parallel out shift register 42. The design of the afore-mentioned random signal unit is generally well-known and described, for example, in the above-reference patents.

The first shift register also has N parallel output ports for transferring the signals stored in respective shift register stages 44 and a serial input port. The serial input port transfers a signal to the first stage.

A second N-stage multibit, serial in, parallel out shift register memory 46 includes a multibit serial input port, for transferring signal to its first stage, coupled to the $y(n)$ output port of unit 10, and N parallel multibit output ports each coupled to one multibit stage 47, each multibit stage, 47, holding one output word of unit 10.

A timing unit 48 generates a CLK signal for generating a series of CLK signal pulses that define a sequence of clock cycles. A linear combiner 50 receives the bistable signals stored in the first shift register 42 and the terms of the impulse response sequence stored in the second shift register 46.

In operation, the linear combiner utilizes the bistable signals, $x(n-k)$, stored in the first shift register 42 as control signals to determine the contribution of each term, $y'(k)$, in the drive data sequence to a term $y(n)$ in the randomized drive data sequence. Two embodiments will be described. The first, described with reference to FIG. 6, utilizes the bistable signals as gating signals to control a set of gating elements in a parallel gating network. This embodiment generates a linear combination with the $y'(k)$ terms multiplied by unipolar coefficients. The second, described with reference to FIG. 6, utilizes the random bistable signals to control an adder/subtracter unit (ASU) and to generate a linear combination with the $y'(k)$ terms multiplied by bipolar coefficients.

FIG. 6 illustrates an embodiment for forming the linear combination of eq. 6 with coefficient term $x(n-k)$ equal to 0 or 1 (unipolar coefficient). Referring now to FIG. 6, a parallel gating network 70 includes a set of N gating elements 72. Each gating element has two input ports coupled to a single bit input from each element 44 of shift register 42 and to a p-bit input from each corresponding element 47 of the shift register memory 46. The stages of each shift register are identified by the index k, and each shift register coupled to the serial input port identified by the index $k=N-1$.

Each gating element 72 also has a multibit output port coupled to one of the input ports of adder 74. The adder 74 also has an input port coupled to the output port of an offset correction unit 76. The output port of the adder 74 functions as the output port of the digital filter.

The operation of the system of FIG. 6 will now be described. At time corresponding to the index n, the contents of shift register 42 contain the bistable values $x(n-N+1)$ through $x(n)$ corresponding to $x(n-k)$, $0 \leq k \leq N-1$ where k is the address index. Simultaneously, the contents of the shift register memory 70 contains the last ($m^{th}$) N-word array $y'_m(n)$ from unit 10 stored in locations $0 \leq k \leq N-1$ with $k=n$. The $k^{th}$ stored binary value of memory 42 and the each bit of the $k^{th}$ stored word of memory 70 logically interact through gate $72(k)$ by the Boolean "and" operation to produce an output equal to $y'_m(k)$ if $x(n-k)$ is true ($x(n-k)=1$) and zero if $x(n-k)$ is false ($x(n-k)=0$). thus, this is equivalent to forming the product $$x(n-k)y'_m(k) = \begin{cases} y'_m(k), x(n-k) = 1 \\ 0, x(n-k) = 0 \end{cases}$$

The output of the N gating elements 72 are digitally summed by the adder/accumulator 74 to form $$y_m(n) = \sum_{k=0}^{N-1} x(n-k)y'_m(k)$$

This expression represents the discrete convolution of $x(n)$ with $y_m(n)$. Because both $x(n)$ and $Y_m(n)$ are time varying, either sequence (array) may be considered as the convolution kernel. However, because the spectral update changes are generally slower than the correlation time of the PRNG 40, the above expression takes on the meaning of a time varying filter with an impulse response of $y'_m(n)$ operating on a stationary random sequence x(n). Significantly, no multiplier is required to generate the product that is summed in the above expression for $y_m(n)$.

The generation of the filter ouput sequence requires that a new sequence of N words representing x(n) be available for forming the next output word $y_m(n+1)$. It is sufficient that the next noise generator sequence be $$[x(n+1), x(n), x(n-1) \ldots x(n-N+2)]$$

a shifted N element array corresponding to the old array less then oldest element $x(n-N+1)$ but with $x(n+1)$ occupying the newest data position, $k=0$.

FIG. 7 is a detailed schematic diagram of a gating element 72. Each gating element 72 includes p AND gates 80 having a first input port for receiving the signal $x(n-k)$, a second input port coupled to a corresponding conductor of the first p-bit databus 78, and an output port coupled to a corresponding conductor of the second p-bit databus 79.

In operation, each AND gate 80 forms the Boolean product of the one bit unipolar signal $x(n-k)$ and a single bit of $y'(k)$. The complete set of p Boolean products forms the arithmetic product of $x(n-k)$ and $y'(k)$.

Because x(n) and y'(n) are statically independent, the mean or expected value at the output of the filter is $$E\left\{\sum_{n=0}^{N-1} x(n-k)y'_m(k)\right\} = \sum_{k=0}^{N-1} E\{x(n-k)\} \cdot E\{y'_m(k)\}$$

noting that $$E\{x(\cdot)\} = 1 \cdot [\text{Probability } x(\cdot) = 1] = \tfrac{1}{2}$$

obtains $$E\left\{\sum_{k=0}^{N-1} x(n-k)y'(k)\right\} = \frac{N}{2} E\{y'_m(k)\}$$

But, $$E\{y'_m(n)\} = E\{w(n) \cdot \hat{x}_m(n)\} = E\{w(n)\} = E\{\hat{x}_m(n)\}$$

where $E\{w(n)\}$ is the average value of w(n), while usually $E\{x_m(n)\}=0$ because the test is run at a net displacement of zero. Thus, $$E\left\{\sum_{k=0}^{N-1} x(n-k)y'(k)\right\} = 0$$

This implies that the means value (DC-term) out of the filter is zero as it should be for a Gaussian zero means drive signal even though the unipolar PRNG sequence has a net average value of $\tfrac{1}{2}$ because the filter impulse response function corresponds to a bandpass filter with zero gain at zero frequency.

FIG. 8 illustrates an embodiment for forming the linear combination of eq. 6 with the coefficient term $x(n-k)$ equal to $+1$ or $-1$ (bipolar coefficient). Referring to FIG. 6, the stages of the first and second shift registers are identified by the index k as described above with reference to FIG. 4. An adder/subtracter unit (ASU) 90 has first and second input ports, an add/subtractor control port, and an enable control port, and an output port. The control port is coupled to the serial output port of the first shift register 42 by a dataline and the first input port is coupled to the serial output port of the second shift register 44 by a first p-bit databus.

The accumulator register 92 has an input port coupled to the output port of the ASU 90, a clear input for receiving a CLR signal, and an output port connected to a selector switch S3 95 that is controlled by the signal 102 which switches the output of the accumulator register 92 to the output buffer 94 each time a new output drive sample is accumulated in register 92.

The serial input port of the first shift register 42 is coupled to the output of the bistable noise generator 40 or to its own serial output port via selector switch S1. The serial input port of the second shift register 44 receives the drive data sequence, y'(n), or its own serial output via selector switch S2. The serial output port of the second SR 44 is also coupled to the first input port of ASU 90 by a first p-bit databus.

The output port of the accumulator register 92 is coupled to the second input port of the ASU 90 by a second multibit databus or to the filter output port via selector switch S3 95.

FIG. 9 is a timing diagram for the system of FIG. 8. Referring to FIG. 9, a CLK signal 100 is generated and the $\overline{\text{ENABLE}}$, 102, SELECT/STORE 104, and SHIFT 106 are derived therefrom. The timing control signals have a periodicity of N+1 cycles of the CLK signal 100. The CLK pulses are identified by the index number n. When the $\overline{\text{ENABLE}}$ 102 is high, the ASU 90 is inoperative. The shift 106 signal increments the two shift registers 42 and 44. When 102 is true, the contents of the accumulator register is stored in the output buffer 94. The selector switch S1 96, is normally connected to its own output. When control signal 104 is true, however, the latest output from the PRNG 40 is stored in shift register 42, once during each cycle of N+1 clock cycles.

The operation of the bipolar system of FIG. 8 will now be described with reference to FIGS. 8 and 9. It is assumed that N terms of the random bistable sequence, x(n), are stored in the first shift register 42 and that N terms of the drive data sequence, y'(n), are stored in the second shift register 44.

The first input of the ASU 90 is coupled to the accumulator register 92 via S3 95, while the second input port is coupled to the second shift register 44 output. The selector switch S2, allows a means for updating the filter kernel, $y'_m(n)$, stored in shift register 44 by means of the S2 97 control line labelled LOAD FILTER KERNEL.

When the control signal 102 is true, the selector S3 95 connects the accumulator register 92 to the output buffer 94. Usually, in practice, the impulse response of the filter $y'_m(n)$ is not updated as frequently as the contents of shift register 42.

After N accumulations, n=N and control signal 102 switches S3 95, connecting the accumulator register R92 to the write port of the output buffer memory 94 which is simultaneously enabled to write by control signal 102. Also, 102 disables the ASU 90 allowing the oldest stored value in SR 42 to be shifted out and lost while the latest output of PRNG 40 is switched into SR 42 via S1 96. Control signal 104 is true during the next half clock cycle thus clearing the accumulator register R92 in preparation for the next N accumulations.

From n=0 to n=N-1, the contents of shift register 42 and 44 are incremented by the shift 106 signal which is staggered by a half cycle with respect to the CLK 100 signal. The accumulator register 92 contents are modified by the contents of shift registers 42 and 44 once each CLK 100 period: the output of shift register 44 being added to the contents of the accumulator when the ADD/SUBT signal is true and subtracted when false. Thus, this has the effect of multiplying, term by term, the contents of shift registers 42 and 44 and accumulating the resulting products. In this way, the contents of the accumulator register 92 at the end of N shift cycles is $$y(n) = \sum_{k=0}^{N-1} x(n-k)y'_m(k)$$

which corresponds to the desired convolution. Accordingly, a new value of the convolution of $x(n)$ and $y'(n)$ is directly formed in N clock cycles.

From the above it is apparent that one term, $y(n)$, in the randomized drive data sequence will be generated every $N+1$ clock cycles. Further, although the effect of each random signal is to multiply the corresponding $y'(n)$ term by $+1$ or $-1$, no multipliers are required. Further, because the $x(n)$ terms are used as control signals to the ASU 90, these signals may be either bipolar or unipolar, although the effect is multiplication by a bipolar signal. No offset term is required because the time average of the bipolar coefficients is zero.

Both methods, i.e., the method described earlier using a unipolar (0,1) PRNG 100 signal or the latter method using bipolar ($\pm 1$) interpretations of the PRNG 100 output signals are functionally equivalent except for a scale factor: the unipolar method being equivalent to an add or not-add instruction results in an RMS scale factor of $\sqrt{2}/2$ relative to the bipolar add/subtract method because the product being accumulated is, on average, zero half the time.

We have described a method and apparatus for an automatic digital random vibration control system capable of producing at equilibrium the required normal (Gaussian) signal with appropriate stationary first and second order statistics. We will now demonstrate that the method described for introducing windowing of the drive signal is superior to the current state of the art.

The output $y'_m(n)$ of the digital filter 12 of FIG. 3, when expressed as a convolution may be represented as $$y(n) = y_m'(n) * x(n) \qquad \text{Eq. 7}$$

where $y_m(n)$ is the impulse response of the filter, $x(n)$ the binary noise sequence, and the asterisk, *, represents the convolution operation.

The discrete Fourier transformation of Eq. 7 is the product $$Y(k) = Y_m'(k) \cdot X(k) \qquad \text{Eq. 8}$$

where the $Y(k)$, $Y_m(k)$ and $X(k)$ are the Fourier transforms of $y(n)$, $y_m(n)$, and $x(n)$ respectively. Because $$y_m'(n) = \omega(n) \cdot \hat{x}_m(n) \qquad \text{Eq. 9}$$

where $\omega(n)$ is the window function and $\hat{x}_m(n)$ is the inverse Fourier transform of $$\hat{X}(k) = \sqrt{S(k)} \, e^{j\theta(k)}$$

where $\hat{S}(k)$ is the updated drive spectrum and $\theta(k)$ is the standardized phase function. Hence, the Fourier transform of Eq. 9 is $$Y_m'(k) = W(k) * \hat{X}_m(k)$$

or $$Y_m'(k) = \sigma_i W(i) \hat{X}_m(k-i) \qquad \text{Eq. 10}$$

Substituting Eq. 10 into Eq. 8 yields $$Y(k) = X(k) \cdot \Sigma W(i) \hat{X}_m(k-i) \qquad \text{Eq. 11}$$

Thus, the drive spectrum is proportional to $$E\{|Y_m(k)|^2\} = E\{|X(k) \Sigma W(i) \hat{X}_m(k-i)|^2\} \qquad \text{Eq. 12}$$

Because $X(k)$ and $\Sigma W(k) X_m(k-i)$ are uncorrelated, $$E\{|Y_m(k)|^2\} = E\{|X(k)|^2\} \cdot E\left\{\left|\Sigma_i W(i) \hat{X}_m(k-i)\right|^2\right\} \qquad \text{Eq. 13}$$

Because for the bipolar case $E\{|X(k)|^2\} = 1$ and because the binary noise sequence has a white spectrum and the system is at equilibrium, $$E\{|\Sigma W(i) X_m(k-i)|^2\} = \sum_i |W(i) \hat{X}_m(k-i)|^2$$

where $$E\{|\hat{X}_m(k)|^2\} = |\hat{X}_m(k)|^2$$

so that Eq. 13 becomes $$E|Y_m(k)|^2\} = \sum_i |W(i) \cdot \hat{X}_m(k-i)|^2 \qquad \text{Eq. 14}$$

This expression is proportional to the expression that would be obtained by widowing and overlapping.

To demonstrate this assertion, consider a single windowed drive vector $x_m(n)w(n)$. Its contribution to the spectrum would be proportional to $$E\left\{\left|\sum_i W(i) \cdot \hat{X}_m(k-i)\right|^2\right\} = \qquad \text{Eq. 15}$$

$$\sum_i \sum_r W(i) W^*(r) \cdot E\{\hat{X}_m(k-i) \cdot \hat{X}_m^*(k-r)\}$$

Because $x_m(n)$ has a white spectrum $$E\{\hat{X}_m(k-i) \cdot \hat{X}_m^*(k-r)\} = \begin{cases} E\{|\hat{X}_m(k-i)|^2\}, & i = r \\ 0, & \text{otherwise} \end{cases}$$

Letting $$E\{|\hat{X}_m(k-i)|^2\} = \overline{|X_m(k-i)|^2}$$

Yields $$E\left\{\left|\sum_i W(i) \cdot \overline{X}_m(k-i)\right|^2\right\} = \sum_i |W(i) \overline{X}_m(k-i)|^2$$

We conclude both methods introduce windowing into the drive spectrum and thus control leakage which limits dynamic range. However, the conventional overlap and add method is limited in its choice of window functions, typically settling for a Hanning window while the method described is free to use any window function because stationarity of the mean square value is maintained.

A frequency domain equivalent to the time domain filter may be implemented by using a well known Fourier transform relationship corresponding to the time domain operation of filtering (convolution). Specifically, the convolution of two time domain functions, say h(t) and x(t), corresponds to the multiplication of the corresponding Fourier transformations, $H(\omega)$ and $X(\omega)$:

$$x(t)*h(t) = \int_0^t x(\tau)h(t-\tau)d\tau \rightleftarrows X(\omega) \cdot H(\omega)$$

This Fourier transform pair implies that frequency domain operations may be used for purposes of filtering.

Thus, the continuous process of time domain filtering may be approximated by a piece-wise frequency domain operation in which the data sequence, x(t), is partitioned into concatenated sections of finite duration, T, such that $$x(t) = \sum_m x_m(t - mT)$$

$$x_m(t - mT) = \begin{cases} x_m(t), & mT < t < (m+1)T \\ 0, & \text{otherwise} \end{cases}$$

Hence $$\sum_m x_m(t - mT)*h(t) \rightleftarrows \sum_m X_m(\omega)H(\omega)$$

where $$X_m(\omega) = \int_{mT}^{(m+1)T} x_m(t)e^{-j\omega t}dt =$$

$$\int_0^{e^{mj\omega t}} \int_0^T x_m(T - mt) e^{-j\omega t}dt$$

Unfortunately, the use of discrete Fourier Transforms (DFTs) such as the well known fast Fourier transform or FFT introduces a further complication. Because DFTs are sampled versions of the Fourier transform they implicitly correspond to periodic versions of the original time domain data. This necessitates the appending of zeros in order to avoid "circular" convolution as described by T. G. Stockham, Jr. in "Digital Processing of Signals", Gold and Rader, McGraw-Hill, 1969, pp. 203–213.

A preferred embodiment of this technique is shown in the following block diagram of a Vibration Control System, FIG. 10, wherein the time domain filter has been replaced by the frequency domain filter shown within the dotted outline. The data to be filtered is supplied by the psuedo-random noise generator (PRNG). The filter characteristic is determined by the impulse response, h(n), from the array multiply operation, w(n)·x(n). If this sequence is N words long, N zeros are appended to avoid circular convolution, before the Fourier transform operation. Note that the FFT used must now operate on 2N real data points to produce H(k). Similarly, the PRNG output is segmented to consist of N data values and N zeros from which $\tilde{Y}(K)$ is obtained via a 2N real FFT. The product $\tilde{X}(K) \cdot \tilde{H}(k)$ is formed and its inverse Fourier transform (IFT) is taken to produce a time domain sequence of 2N duration. The first N words are added to the previously obtained last N words (overlap and add operation) while the last N words are temporarily stored for the next overlap and add operation. The output is fed to the system DAC as previously described.

Many other variants of this frequency domain filtering operation such as "select-saving" are possible and will suggest themselves to those versed in the art of digital signal processing. (See H. D. Helms, "Fast Fourier Transform Method of Computing Difference Equations and Simulating Filters", IEEE Trans. Audio Electroacoust., Vol. AU-15, pp. 85–90, June 1967). (Also see Otnes and Enochson, "Applied Time Series Analysis", Vol. 1, John Wiley and Sons, 1978, pp. 280–306).

Several embodiments of the invention have been described. Modifications and substitutions will now be apparent to persons of ordinary skill in the art. In particular, the functions of the hard-wired embodiments of FIGS. 6 and 8 may implemented by a programmed digital computer or microprocessor. The randomized bistable sequence could be stored or generated in the computer and the drive data sequences could be stored in the computer memory and the processor could be programmed to supply the correct terms to the gating elements of FIG. 4 or to the control port and first input port of ASU 90. Additionally, the processor could control the generation of the required control signals. Other hard-wired embodiments are also within the scope of the invention. Accordingly, the invention is not intended to be limited except as provided by the appended claims

What is claimed is:

1. A vibration control system that includes a vibrator mechanism for transferring vibrational energy characterized by a stored desired reference spectrum to a device under test (DUT), where the vibrator mechanism is energized by a drive signal, and where the power spectrum of the drive signal is determined by the output of a filter acting on a random noise source, and where a transducer coupled to the DUT generates an actual response signal characterized by the actual vibration spectrum experienced by the DUT, said filter having a frequency response determined by comparing the actual vibration spectrum experienced by the DUT with the stored desired reference spectrum, said system comprising:

a random noise generator for providing a random noise signal;

a digital filter including a programmable impulse response generator that receives a drive spectrum impulse response signal, with said digital filter having an input coupled to said random noise generator, an output for providing the drive signal, and having an impulse response characterized by a drive spectrum representative of the frequency response required to modify said random noise signal to produce a drive signal that will cause the actual DUT vibration spectrum to approach the desired reference spectrum, said digital filter for filtering said random noise signal to generate the drive signal;

a spectrum analyzer, coupled to said transducer to receive the actual response signal, for estimating the actual vibration response spectrum;

a comparator, having an input for receiving the stored desired reference spectrum and an input coupled to said spectrum analyzer to receive the estimated actual vibration response spectrum, to provide a required frequency response signal, with the required frequency response representing the difference between the actual and desired vibration spectrums;

a frequency domain to time domain transformer for converting said required frequency response signal to a time domain impulse response signal; and a multiplier for multiplying said time domain impulse response by a preselected window function to provide a modified low leakage power spectrum impulse response signal coupled to the programmable impulse response generator of said digital filter.

2. The system of claim 1 wherein:
said random noise generator, said frequency domain to time domain convertor, and said spectrum analyzer are implemented in a programmable computer.

3. The system of claim 1 wherein:
said random noise generator is a binary output random noise generator.

4. The system of claim 1 wherein:
said random noise generator is a pseudo-random binary sequence generator.

5. The system of claim 3 wherein:
said digital filter performs only additions and subtractions of the received values of said impulse response function according to the binary state of said random noise function.

6. The system of claim 1 wherein said comparator means comprises:
means for applying a preselected phase function to said required frequency response to create a complex required frequency response with a non-uniform phase distribution.

7. The system of claim 3 wherein:
said binary output random noise generator is implemented in a programmed digital computer.

8. The system of claim 4 wherein:
said pseudo-random binary sequence generator is implemented in a programmed digital computer.

9. The system of claim 5 wherein;
said additions and subtractions are implemented in a digital computer.

10. The system of claim 6 comprising:
said means for applying said preselected phase function is implemented in a digital computer.

* * * * *